United States Patent [19]

Alldredge

[11] 4,290,785
[45] * Sep. 22, 1981

[54] DUST COLLECTOR AND METHOD OF OPERATION

[76] Inventor: Robert L. Alldredge, 130 Pearl St., Apt. 1108, Denver, Colo. 80210

[*] Notice: The portion of the term of this patent subsequent to Feb. 13, 1996, has been disclaimed.

[21] Appl. No.: 11,442

[22] Filed: Feb. 12, 1979

[51] Int. Cl.³ .................... B01D 41/02; B01D 46/04; B01D 46/30
[52] U.S. Cl. .......................................... 55/96; 55/98; 55/291; 55/293; 55/475; 55/485; 55/513; 55/DIG. 9; 422/171; 422/179; 422/239
[58] Field of Search .................. 55/96, 98, 99, 291, 55/293, 300, 474, 475, 485, 487, 513, DIG. 9; 422/171, 179, 181, 239; 210/263, 269, 271, 274, 277, 280, 282, 287, 290

[56] References Cited

U.S. PATENT DOCUMENTS

| | | | |
|---|---|---|---|
| 2,101,961 | 12/1937 | Slidell | 210/290 |
| 2,723,761 | 11/1955 | Van Der Made et al. | 210/196 |
| 3,202,286 | 8/1965 | Smit | 210/286 |
| 3,278,031 | 10/1966 | Rosaen | 210/134 |
| 3,341,365 | 9/1967 | Berz | 55/300 |
| 3,374,052 | 3/1968 | Fan et al. | 210/20 |
| 3,387,630 | 6/1968 | Routson | 210/266 |
| 3,535,852 | 10/1970 | Hirs | 55/523 |
| 3,838,977 | 10/1974 | Warren | 422/179 |
| 3,956,128 | 5/1976 | Turner | 210/274 |
| 4,139,473 | 2/1979 | Alldredge | 210/290 |
| 4,157,959 | 6/1979 | Wen et al. | 210/20 |

FOREIGN PATENT DOCUMENTS

| | | | |
|---|---|---|---|
| 245891 | 10/1911 | Fed. Rep. of Germany | 210/287 |
| 1194873 | 12/1960 | France | 55/487 |
| 1,435,608 | 5/1976 | United Kingdom | 422/171 |

*Primary Examiner*—David L. Lacey
*Attorney, Agent, or Firm*—Kyle W. Rost

[57] ABSTRACT

An upwash, upflow or downflow, graded sand bed dust collector has a reusable imperforate or slightly porous diaphragm on the top of the graded filter media and an inlet for pressurized gas above the diaphragm for inflating the diaphragm against the media during dust removal stage. The dust collector housing can be flared upwardly and outwardly at selected portions to reduce the velocity of upflowing gas during wash stage for improved grading of the filter media. A natural foraminous layer may be self-grading at the top of the filter media, allowing a circumferential or side outlet for filtrate. A layer of fine, dense filter media may also be used to increase the size range of media particles in the dust collector. Special diaphragms may be composed of individual leaflets that rise above the filter media but not to the level of the gas exit during the wash stage, and which settle on top of the filter media during the filter stage. To improve the fluidization of the filter media during the wash stage and the sand bed can be vibrated or oscillated. An alternate design has a moveable screen above the filter media to compress the media during the dust collection stage. Performance is improved by providing immediately below the screen a layer of material which is coarser than the layer of material below that top layer.

19 Claims, 9 Drawing Figures

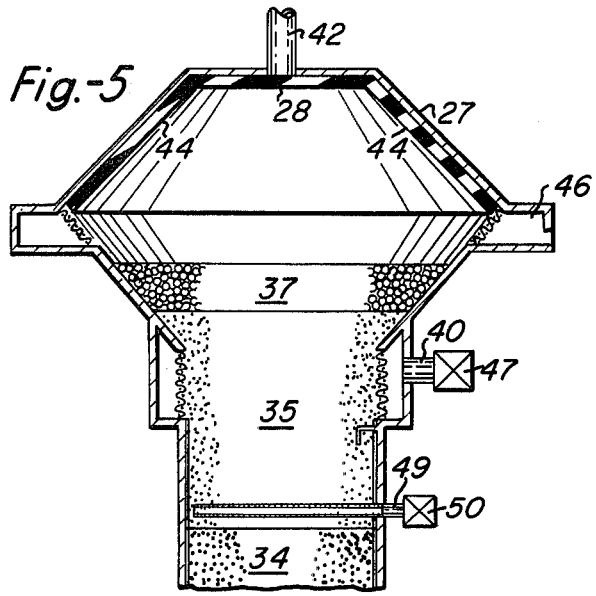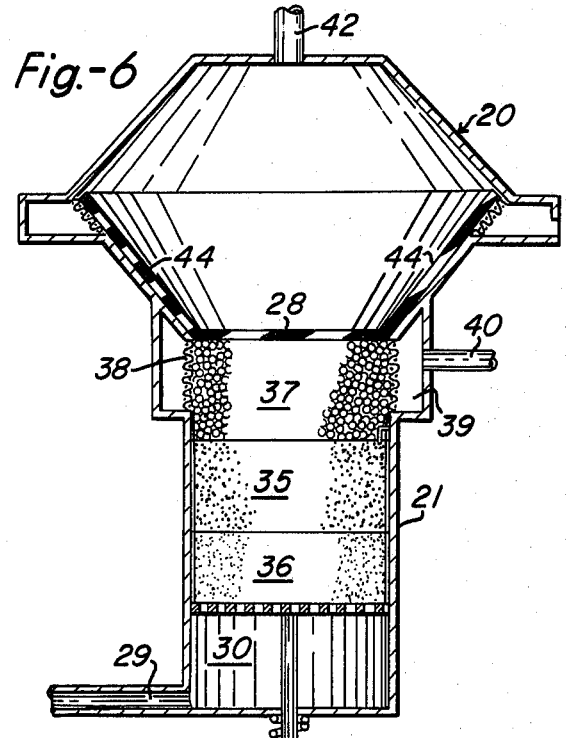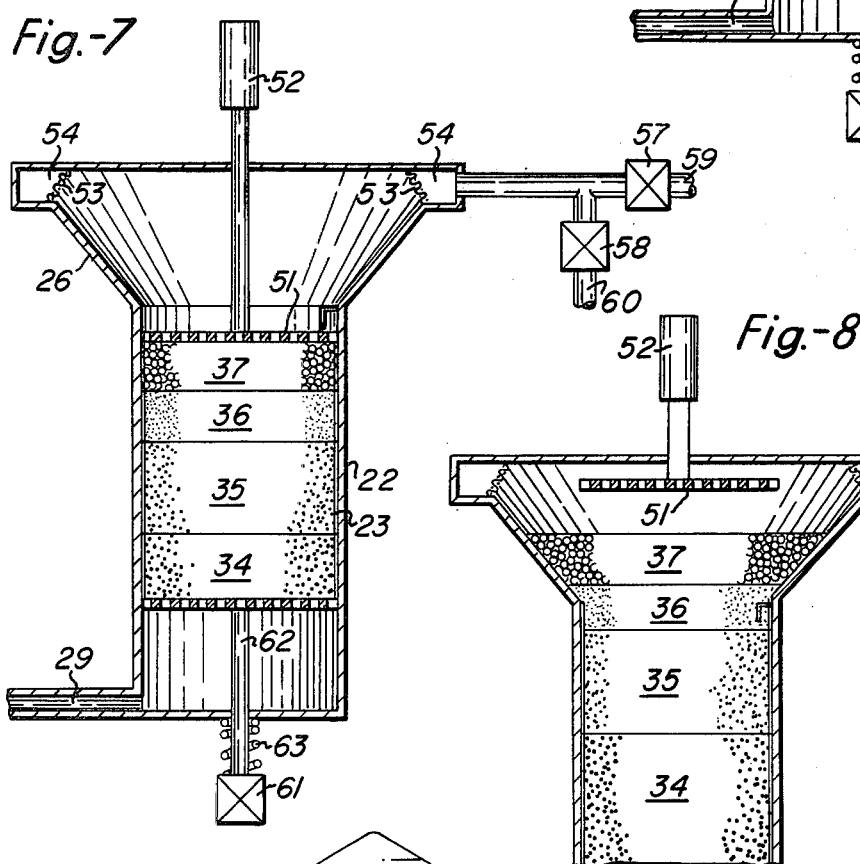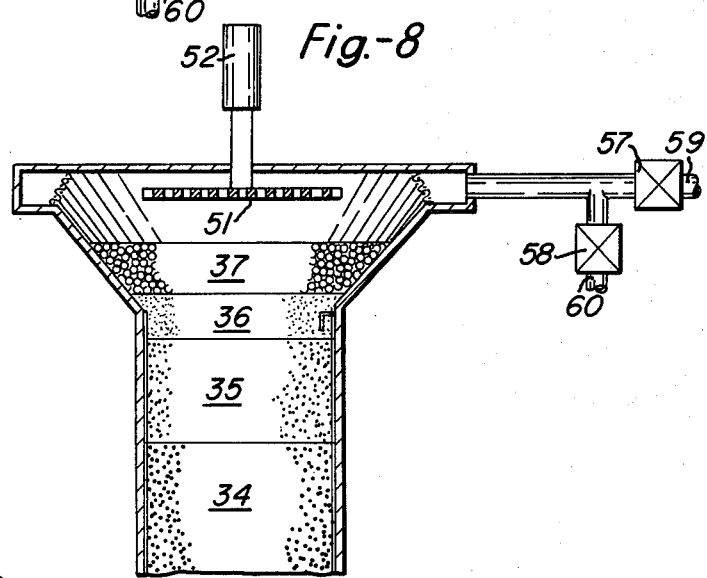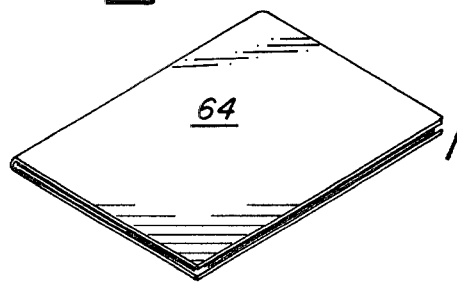

DUST COLLECTOR AND METHOD OF OPERATION

BACKGROUND OF THE INVENTION

1. Field of the Invention

The invention relates to gas separation. More specifically, the invention relates to a dust removal apparatus for combustion products and other gases. An upflow or downflow, up-wash graded sand filter is disclosed.

2. Description of the Prior Art

Sand or gravel bed filters are well known as filtering devices for gases, usually hot gases. Several configurations of sand-bed and gravel-bed filters are well known, including down-flow filters and up-flow filters. In the industry a prominent design of down-flow filters is referred to as a "gravel-bed filter."

Down-flow filters represent the simplist form, consisting of a tank containing a filtering medium such as sand or gravel and having a top inlet for dust-laden gases and a bottom outlet for filtered gas. Where the filtering medium is sand and gravel, the sand and gravel will be of various sizes. To remove the accumulated dirt from the sand and gravel, a washing or wash stage is conducted wherein gas is blown up through the bed and at the same time the upper portion of the filter media is raked by rabble arms to lift the sand and gravel and roll it around. At the conclusion of washing, the sand settles in its mixed state and, accordingly, is not graded in the filter with the fastest settling particles at the bottom and the slowest settling particles at the top. When the filtering operation is taking place, the finest particles in the gas which can be filtered out by the size of media present are filtered out by immediate contact with the finest particles of sand mixed with the coarser gravel at the top of the filter, and the remaining solids merely build up on the top of the filter. Very little material is caught in the rabbled portion of the bed of sand under these conditions.

Coarse sand or small gravel does not remove fine dust particles; in commercial gravel bed filters no fine media is used, the fine particles of dust are not removed by the filter, only coarser dust particles are removed by the filter, and because the filter media is uniformly coarse, the coarser dust particles are removed inside the gravel bed and less so at the surface, although most of the dust removed is trapped in the upper few inches of the bed.

An operating design of graded coarse to fine up-flow sand-bed filter is used to remove radioactive particles from exit gases from certain nuclear operations. Normally the bed in this filter is not washed, and is abandoned after it has become loaded with fine particles. (G. H. Sykes and J. A. Harper, "Design and Operation of a Large Sand Bed for Air Filtration," In *Treatment of Air-Borne Radioactive Wastes*, Intl. Atomic Energy Agency, Vienna, 1968, pp 215,220). The top filter media is fine sand, the dust particles uniformly are fine so that no bridging occurs at the inlet surface of the filter media, and the finest of dust particles are trapped and are removed in the bed of sand. Superficial air velocities in this dust filter are 4.7 feet per minute. To prevent the 30 to 50 mesh sand filter bed from being blown out of the collector, the media is covered with and weighted down by 6" of 4 to 8 mesh gravel and 6" of $\frac{1}{4}$" to $\frac{1}{2}$" gravel. Tests have been conducted in which uniformly fine dust particles have been filtered out in sand-bed filters. No coarse dust particles were present, and because of the absence of coarser dust particles to bridge the interstices of the filter media, the initial surface of the filter media did not become plugged, and the fine dust particles were trapped throughout the bed of filter media. These fine-sand filters removed particles in the 0.1 micron to 3.0 micron range.

Typical operating conditions for a standard downflow commercial gravel-bed filter are flow rates of 100–180 cfm/sq. ft. of cross section and a dirt holding capacity of 0.04–0.08 lb./sq. ft. of cross section. Most of the pressure drop is due to passage across the thin layer of filtered solids in the upper bed of the filter. Because the gravel is coarse ($\frac{1}{8}$–$\frac{1}{4}$ inch), dust smaller than 1 micron is not removed adequately.

The disadvantages of commercial upgraded media filters have suggested that an up-flow and/or downflow filter with flow from coarse to fine media is a far more practical filtering device, but such filters present a number of problems. The greater efficiency of such filters, especially of an up-flow filter, is attributed to the classification of particles that occurs in the washing cycle of the filter: for example, in an up-flow filter the largest particles of sand settle to the bottom of the filter and the smallest at the top. Then, as the gas to be filtered is blown into the sand from the bottom, the coarser impurities are trapped in the coarser layer of sand and the finer impurities pass into finer layers of sand before being trapped.

Typical operating conditions for a graded coarse-to-fine sand-bed dust collector are flow rates of 12 to 100 ACFM/sq. ft. cross section and dirt holding capacities of up to 0.06 lb./sq. ft. cross section. The filterable solids are distributed throughout the sand and the pressure drop is likewise distributed across the entire body of sand. Thus, if the sand can be held in place, the flow rates can be much higher than in a down-flow filter for the same pressure drop, and finer media can be used so that finer dust particles can be removed.

Removal of the particles or droplets is improved if laminer or viscous flow is maintained in the filtered media. If the filter-media grains move during the filtering stage, the gas flow becomes less laminer or less viscous, and dust particles are released. High flow rates during the dust removal stage tend to lift and move the filter media grains. A number of attempts in the prior art have faced the problem of holding the sand in place during high filtering rates in an up-flow liquid filter. U.S. Pat. No. 620,621 to Veazie teaches containing the sand layer between an upper and lower foraminous diaphragm, with the upper diaphragm being connected to a device for applying pressure to sand layers to hold the sand particles close together for efficient filtering. U.S. Pat. No. 3,278,031 to Rosaen teaches a piston arrangement for compressing the filtering medium under a perforated plate, and the pressure of the piston is released to allow medium to expand for washing. U.S. Pat. No. 2,723,761 to Van Der Made et. al. teaches an up-flow filter that routes some of the liquid to the top of the filter to supply compacting pressure to the bed of filtering media. U.S. Pat. No. 3,202,286 to Smit teaches the use of an open grate across the top of the filtering media to hold the media in place through natural bridging between elements of the grate.

A problem found in graded-media up-flow or downflow filters is that the filter rate is limited by the need to hold the top layers of the filtering media in place. The foraminous devices used on the upper layer of the media in the Veazie, Rosaen, and Smit patents will yield some of the filter material through the perforations of the hold-down device if the flow rate is high enough. Alternatively, if the hold-down device is pressurized to oppose higher filter rates, as in the Van derMade et. al. patent, there is danger that the pressurized fluid will channel to the filtrate outlet, and all filtering action will immediately cease. If a mechanical hold-down device is created with small enough perforations to physically retain the filter media against high pressure without depending upon bridging of the media particles, the hold-down device itself may become the finest layer of filtering media and be subject to rapid clogging, or in an upflow filter the upper layer of filter media may be required to be coarse enough that extremely thorough filter action cannot be achieved.

A further problem exists in cleaning a graded up-wash filter. It is desirable to loosen the beds of filter media and suspend the particles so that they can move freely, thereby releasing dirt trapped in the interstices. To accomplish this task in apparatus such as that taught in the Smit patent, it is necessary to use wash flow rates greater than filter flow rates, often requiring a separate wash pump or blower for the task. Furthermore, in all prior up-flow up-wash graded filters, the wash rate is limited according to the rate that will lift the finest particles of the filter media completely out of the filter housing. During an up-wash process, the finest media particles form a visible plane at the top of the wash flow, and the adjustment of flow rates between a rate that will retain the particles and a rate that will wash the particles away must be carefully controlled.

Ideally, the filter media should be cheap and readily available, with sand being a preferred material. In the up-wash process, it is known that the media will be self-sorting into layers graded according to the size of the particles when all particles are of similar density, the larger particles settling at the bottom of the filter and the smaller particles at the top. If in cleaning the filter the finest particles are to be retained and not blown out the top of the filter with the dirt, then there is an additional limitation that the largest particles must be of sufficiently small size that they can be lifted and suspended in the wash gas while the wash flow rate is maintained below the rate that will remove the finest particles from the top of the filter. Ordinarily, the settling rates of various sized particles of similar density are such that maximum size ratio between the largest and smallest media particles is approximately 3:1, which is not a very great range.

The present invention seeks to solve these and other problems of the prior art, as will be disclosed below.

SUMMARY OF THE INVENTION

An up-flow, up-wash dust collector has a body that can be parallel sided or flared upwardly and containing filter media during normal filter stage operation, and a portion of the filter above the normal operating level of the media is relatively more broadly flared upwardly, the latter portion receiving the upper part of the filter media during up-flow washing. An elastic or flexible or folding diaphragm having greater surface area than the area of filter media contacted during filtration stage is connected to the top of the upper flared portion of the filter. The diaphragm is pressurized on its upper surface to compress the filter media during dust filtration. The media in the filter is naturally graded during washing stage and may have an upper layer of extra fine, relatively denser material. Alternatively, the top layer may be coarse material of relatively lower density that settles on top of the top fine media below it, and forms a natural foraminous layer that holds the underlaying media in place. Fluidization of the bed of filter media during the upwash stage increases the removal of the collected dust; the media bed can be vibrated during the wash stage to increase the fluidization of the bed and to reduce channeling and spouting of the gas through the bed.

An object of the invention is to increase the available size ratio between the smallest and largest filter media particles in a self-grading up-flow up-wash sand filter, thereby improving the dirt holding capacity of the filter as well as increasing the thoroughness of available filtration in a single filter.

A further object is to create a diaphragm hold-down that does not require excessive stretching and that can be recessed easily for wash operations.

Another object is to increase the performance of a filter by drastically increasing the size range of the particles without simultaneously increasing the range of settling velocities.

An important object is to create a filter capable of operation in the up-wash mode and with coarse-to-fine filtration in either up-flow or down-flow mode. In an up-flow filter, the gradation of the filter media from coarse to fine is relatively easy to achieve through the use of similar materials having varying coarseness. A self-graded coarse-to-fine down-flow filter requires that the media at the bottom of the filter be the finest and therefore the densest, while the media above the finest layer must be coarser and therefore of much lighter density for self-grading.

A further important object is to greatly increase the flow rates possible in a filter using granular filter media. In both up-flow, down-flow, and combined up-and-down flow toward a central exit, vastly greater filter rates are achieved with the use of a diaphragm to compress the media.

Still another object is to enable the use of a mechanical screen hold down without causing the screen to become the finest layer of the filter.

BRIEF DESCRIPTION OF THE DRAWINGS

FIG. 5 is a view similar to FIG. 4, showing the second modified embodiment of the dust collector in wash stage.

FIG. 6 is a view similar to FIG. 4, showing a third modified embodiment of the dust collector in filter stage.

FIG. 7 is a view similar to FIG. 1, showing a fourth modified embodiment of the dust collector in filter stage.

FIG. 8 is a view similar to FIG. 7, showing the fourth modified embodiment of the dust collector in wash stage.

FIG. 9 is an isometric view of the diaphragm-forming leaflet.

DESCRIPTION OF THE PREFERRED EMBODIMENT

Figure 1:
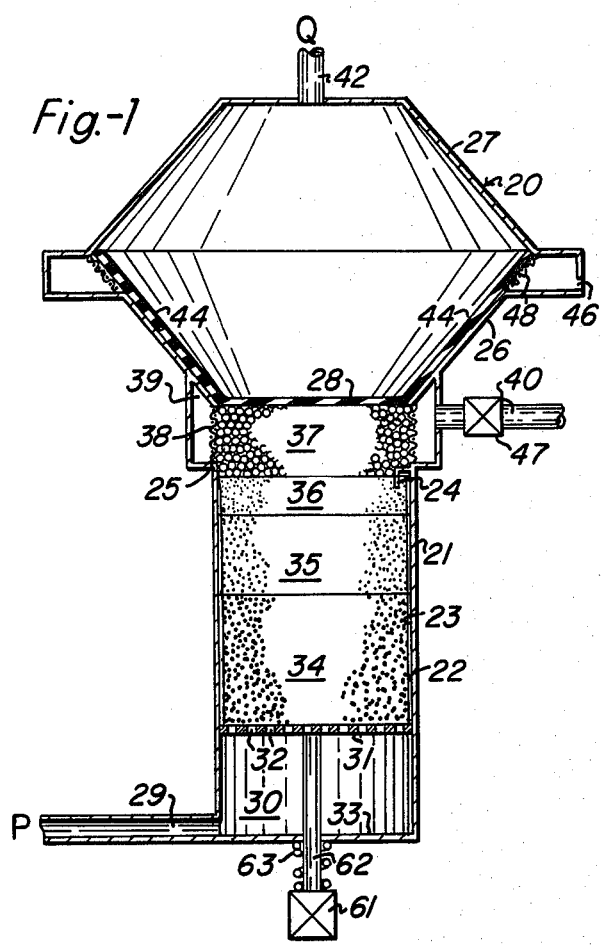
FIG. 1 is a vertical cross-sectional view of the dust collector showing the layers of granular filter media in filter stage.
Figure 2:
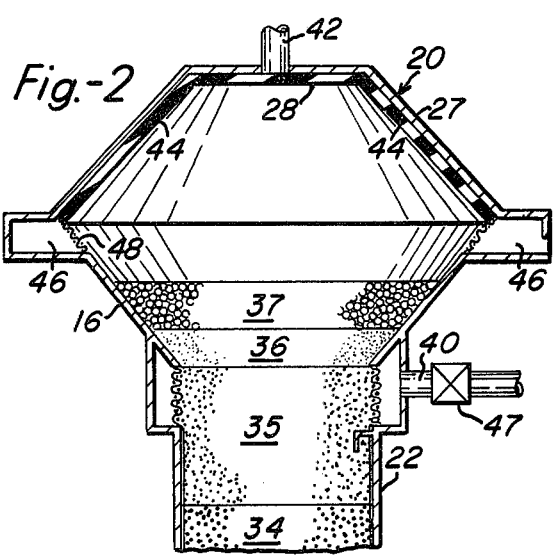
FIG. 2 is a vertical cross-sectional view of the upper portion of FIG. 1 showing the diaphragm and filter media in wash stage.

The invention is generally shown in FIG. 1 to include the sand bed dust collector 20 as a whole in a vertical configuration. The dust collector includes a housing 21 having a lower housing portion 22 that normally contains the granular filter media when the filter is being operated in the filter stage. As used in the following disclosure and claims, the term "filter stage" refers to the opeation of the collector to clean particulate matter from a fluid being transmitted through a bed of filter media; and the terms "wash stage," "up-wash," and "washing" refer to operation of the collector to remove the accumulated particulate matter from the filter media. The sides of lower portion 22 may be vertical and therefore parallel to one another, forming a cylinder when the filter housing is round; or the sides may be upwardly flared to a first degree, forming a frusto-conical lower housing portion. Optionally, the lower housing portion may contain an inner vessel 23 that contains much of the filter media during filter stage. Vessel 23 is suspended independently from housing portion 22 by a baffle 24 or flexible connection 25 at the top end of the vessel. Immediately above the lower housing is upper housing portion 26 that is flared upwardly to a second degree that is greater than whatever flare the lower housing portion may have. A domed top 27 covers the upper end of the upper housing portion. A diaphragm 28 is contained within the housing 21 and is connected to the sides of the upper portion 26 near the union with the domed top 27. Near the bottom of the dust collector 20 is gas inlet 29 feeding lower chamber 30, which is at least partially closed at its upper end by media supporting plate 31, which is the bottom of inner vessel 23 when such a vessel is employed, and alternatively is a plate attached between the sides of the filter housing portion 22. The plate contains a plurality of openings 32 that allow gas from chamber 30 to pass upwardly into the media. The chamber 30 is otherwise enclosed by the lower housing walls and by bottom wall 33.

Where the inner vessel 23 is employed, it contains granular filtering media that is graded from coarse to fine according to natural settling velocities of the media material in the embodiments of FIGS. 1 and 2. Immediately above plate 31 is a coarse layer 34 of, for example, 2 to 3 mm. gravel. Above layer 34 is a finer layer 35 of, for example, 1 to 2 mm. sand. At least part of the remaining volume of the inner vessel 23 may be filled with a still finer layer 36 of, for example, 0.5 mm. garnet of magnetite, which would also have a relatively greater density than the underlying sand and gravel layers. An upper, coarser layer 37 may be contained at least partially above vessel 23 in housing 22. Above the inner vessel 23, near the top of the lower housing portion 22, but below the diaphragm 28, the housing may have perforated or screened sides 38. A collecting chamber 39 surrounds the screened sides and is joined to an exit 40 for removal of cleaned gas. Above finest media layer 36, the coarser layer 37 of, for example, 4–6 mm. plastic beads, which would be lighter in density than any of the underlying beads, fills the lower housing 22 through the vertical portion having the screened sides 38. The layer 37 serves as foraminous media between layer 36 and the screened sides 38 so that the screened sides 38 may have larger openings and do not become the finest filter media. The openings in the screened sides are therefore small enough to prevent loss of the media in layer 37, but are nonetheless larger than the media of layer 36.

Diaphragm 28 is pressed downwardly against the layers of filtering media at a level approximately equal to the interface between lower housing portion 22 and upper portion 26 when the filter is in filter stage by means of gas pressurizing means connected to upper portion 26 above the diaphragm through conduit 42 in top 27. When the diaphragm is pressed against the filtering media as shown in FIG. 1, the sides 44 of the diaphragm are also pressed against the outwardly flared wall of the upper housing, sealing dirty gas overflow 46 located in the upper region of the housing 26 but below the connection of the diaphragm to the housing.

Typical dimensions of a filter are illustrated in FIG. 1 include a lower width at bottom 33 or plate 31 of portion 22 of 18 inches, and where the sides of the collector flare out with increasing height, an upper diameter of portion 22 (also the lower diameter of portion 26) of 22 inches. The broadest part of portion 26 adjacent top 27 may be 60 inches. The vertical height may be subdivided with 12 inches for chamber 30, 10 inches for layer 34, 10 inches for layer 35, 4 inches for layer 36, and 6 inches for layer 37. Upper housing 26 may have a height of 15 inches, and the domed top 27 may also be of this height.

During dust collection, shown in FIG. 1, the gas to be filtered, most commonly boiler exhaust gas, is pumped into chamber 30 via inlet 29 under pressure from blower P. The gas passes through perforated plate 31 and flows upwardly through layers 34–36, each layer capturing progressively finer particles from the gas. The gas then enters foraminous layer 37 and exits the dust collector through screened sides 38 and outlet 40. Flexible diaphragm 28 is pressed against the top of the media with whatever force is required to hold the media in place against the flow of the gas. Blower Q may supply the required pressure for the diaphragm. Flow rates of 100 cubic feed of dirty gas being filtered per square foot of media can be used.

During sand washing stage, shown in FIG. 2, outlet 40 is sealed, for example by closing a valve 47, and diaphragm 28 is drawn upwardly into domed top 27 by suction applied through conduit 42; or alternatively, the pressure through conduit 42 may simply be released. When the diaphragm is so raised, gas overflow 46 is in free communication with the interior of housing 21. The same external source of pressurized gas used during filtration stage may supply pressurized gas during wash stage, the gas flowing as before through inlet 29 and upwardly through the layers of media. The upflow of gas may be at a sufficient rate to loosen and suspend the sand and other media, freeing captured dirt particles and allowing them to flow out of the filter through dirty gas overflow 46. With diaphragm 28 released during wash stage, blower P may be operated at the same or less output as during filtration, since washing usually will require less gas per square foot or filter media than actual filtering; thus no separate larger-capacity blower is needed during the wash stage. A coarse screen 48 covers the gas overflow 46 and is of proper size to catch any beads of layer 37 that may be blown against the screen; however, the layer 37 ordinarily remains suspended above media layer 36 and below the overflow 46 during wash stage.

In an alternative configuration of FIG. 1, the layer 37 may be a foraminous separator attached directly to the lower face of diaphragm 28. During filtration stage, the layer 37 would perform as previously described to receive clean gas from layer 35 or 36 while holding the sand of layer 35 or 36 in place, due to bridging of the sand between adjacent particles of layer 37. However, during wash stage the alternative layer 37 need not be suspended by the rising steam of gas but will be raised by the physical movement of the diaphragm into the domed top 27, above the gas overflow 46.

If lower housing 22 or vessel 23, whichever directly contains the filter media, is flared, the flare results in reduced velocity of the upwardly flowing gas as the gas travels from the narrow bottom chamber 30 or plate 31 to the relatively wider upper end of housing 22 or vessel 23 containing finer sand layer 36. During filtration stage, this flare produces a more even distribution of the gas passing through the fine media and increases dirt holding capacity of the filter, as compared to a standard straight side filter housing. During wash stage, the flare allows more uniform lift of the various sized media since the higher velocity of the wash gas at the bottom of the housing must suspend relatively larger media, while the lower velocity gas at the top of the media must suspend relatively smaller media. A coarser range of media may be employed in the filter 20 than in a similar filter of straight side design, with size ratio of 1:8 being achievable by designing the proper flare into portion 22 or vessel 23.

Upper portion 26 is also flared, but to a greater degree than portion 22. During normal operation in filter stage, the media is not present in upper portion 26, but the layers of media are vertically expanded during wash stage and some of the finest media 36 and any coarse lighter foraminous media 37 enter portion 26. In a conventional filter, the finest media forms a distinct plane during up-wash, and in filter 20 the greater flare of portion 26 provides a sharp dividing line in flow velocity, substantially reducing the opportunity for these media particles to be blownout the top of the filter through coarse screen 48 covering overflow 46. Pump P can operate at the same or slower rate for washing as for filtering, and due to the superior gas/media separation in portion 26, the exact adjustment of the wash rate is far less important to retaining layers 36 and 37 than in conventional filters. The flare of portion 26 would also be a substantial advantage during filtration with a grate-type apparatus such as that taught in U.S. Pat. No. 3,202,286 to Smit, incorporated herein by reference for this teaching.

At the conclusion of the wash stage, the coarse to fine grading of the filter media layers 34–36 is preserved because the settling velocities of the media particles are within a narrow range, thus enabling all layers of sand to be made turbulent while still not blowing the fine particles of media out of the filter. The flare of the filter housing increases the available range of settling velocities, but the performance of the dust collector 20 or of any upflow graded coarse-to-fine sand dust collector can be improved by otherwise drastically increasing the size range of media particles, for example to 10:1, without simultaneously increasing the range of settling velocities. In the present filter, this is accomplished by adding the layer 36 of finer, denser media, as compared to the underlying layers 34 and 35. Because the media of layer 36 is finer and denser than the sand or gravel, and has greater specific gravity, the layer 36 is normally graded into the top layer of the filter sand charge of the media during up-wash sand cleaning stage. The coarser layer 37 above the filter media is normally graded above the fine, dense layer 36 because of the lower density of the coarse particles, as compared to any of the underlying layers.

Figure 3:
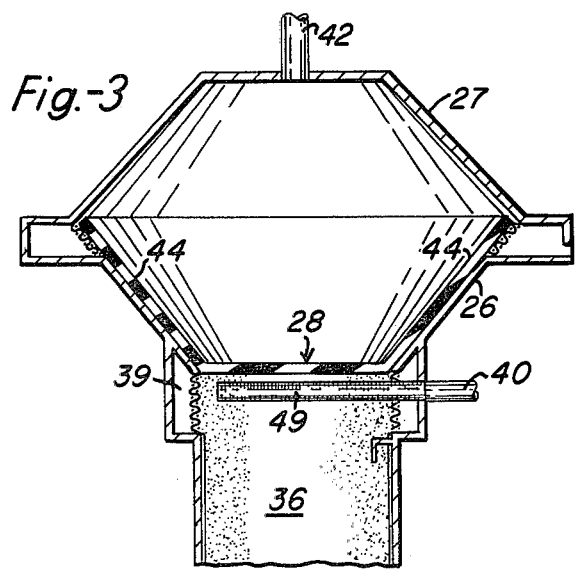
FIG. 3 is a view similar to FIG. 1, showing a first modified embodiment of the invention in filter stage.

A variation of the dust collector structure in FIG. 3 eliminates the uppermost coarse layer 37 and permits the finest layer 36 to directly fill the top of the filter housing portion 22. Thus, the diaphragm 28 contacts the finest media layer, and the cleaned gas exits the filter housing from layer 36 through screen sides 38 of FIG. 1, or as illustrated in FIG. 3, through a perforated tube 49 inserted into the upper layer of media. The tube extends through the side of the housing 22 to direct the gas to an exit, either through a collecting chamber 39 or by direct routing to an exit conduit 40.

Figure 4:
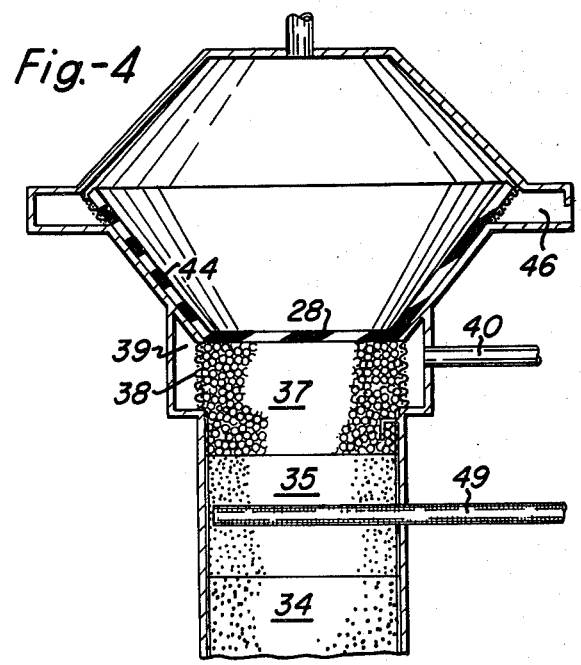
FIG. 4 is a view similar to FIG. 1, showing a second modified embodiment of the dust collector in filter stage.

A further embodiment is shown in FIGS. 4 and 5 wherein a central foraminous tube 49 is attached to inner vessel 23 someplace in but preferably near the center of sand layer 35. Below layer 35 is layer 34 as previously described, and on top of layer 35 is layer 37 of coarse, low density material. Header 39 and conduit 40 serve as a gas inlet in addition to gas inlet 29, while central tube 49 is the outlet for the clean gas. In operation, the embodiment of FIG. 4 is a two-way filter receiving gas both above and below the outlet and passing it through a coarse-to-fine graded bed in both directions, thereby handling a much greater gas flow than with an upflow filter alone. Diaphragm 28 compresses the filter media to any desired degree, as previously explained, or the diaphragm may be omitted.

During sand cleaning stage, as shown in FIG. 5, flow through conduit 40 and outlet tube 49 are closed by appropriate sealing means 47 and 50, diaphragm 28 is moved into the domed top 27, and the up-wash gas is pumped through inlet 29 to loosen and suspend the sand and other filter media particles as the gas exits through overflow 46.

Various combinations of the embodiments of FIGS. 1, 2 and 4 are possible. Fine sand layer 36 of finer, denser material such as magnetite, may itself include a self graded-range of particle sizes for extremely fine filtration. Layer 36 may extend upwardly to just below the lower edge of screen 38. Immediately on top of layer 35 can be layer 37 of coarse, low density media. If desired, layer 37 may include a range of increasingly coarse, increasingly low density beads that is self-grading upwardly in increasingly coarse layers. Layer 37 fills the area adjacent to screened sides 38 and acts as a moveable foraminous separator that is not fixed to the filter housing 22. During wash stage the layer 37 assumes the configuration shown in FIG. 2.

A further embodiment is shown in FIG. 6, wherein after the natural grading during upwash the fine dense media 36 is below coarser less-dense media 35 which is below coarse low density media 37. During the dust collection stage the dirty gas enters at conduit 40 and leaves through exit 29. At high flow rates, upwash reverse-graded downflow uncompressed sand bed collectors sometimes will have the top surface channeled by the down-flowing gas. Compression of the sand bed prevents this and permits higher flow rates.

The diaphragm 28 has the ability in all of the above described embodiments to compress the filter media in opposition to the up-flow force of the gas being filtered. An ordinary diaphragm of approximately the same diameter as the sand surface is placed under high stress when the sand is greatly compacted, and such diaphragms have been found subject to premature failure.

Accordingly, the diaphragm 28 has an unstretched surface area substantially greater than the area of sand that is contacted during filter stage. The difference in area enables the diaphragm to withstand far greater pressures applied to its upper surface and also provides a convenient means of removing the diaphragm from the top of the filter media during wash stage. The greater area and diameter of the diaphragm results in less severe stretching, if any, during sand compression because of added side material 44. Preferred materials for the diaphragm include rubber or other elastic material suited to resist chemical interaction with the gas being filtered, if the gas temperatures are low. For high temperature gases, such as combustion exhaust gases a preferred material is a cloth made of glass fiber or made of ceramic fibers such as 3M Ceramic Cloth. It is not necessary that the diaphragm be entirely imperforate, but the relation of the porosity of the diaphragm and the flow rate of the pressurizing gas must be such that a pressure is produced on the diaphragm which is sufficient to hold down the filter media against the upward force of the gas being filtered. The perforations of the diaphragm are preferred to be smaller than the coarseness of the top layer of filter media. The life of the diaphragm is increased if the pressurizing gas entering through conduit 42 is clean and cool.

A further embodiment is shown in FIG. 7, wherein the upwash graded media 34, 35, 36 are compressed by a perforated or screened surface 51 by a force applied from a mechanical means 52, which may be, for example, a pneumatic cylinder. Because the surface 51 is mechanically operated, there is no need for a domed top on the dust collector, but the upper portion 26 of the housing is nevertheless flared upwardly and capped. At the upper end of the housing, a retaining screen 53 covers the gas outlet chamber 54, which may be annular. Coarser lower density media 37 can be provided which will naturally suspend, during the upwash, above the finest sand layer 36 which will provide a coarser transition zone between the finest filter layer 36 and the screen hold down. During dust collection stage the dirty gas enters through entry 29; passes up through the sand layers and through screen hold down 51; out through screen 53, chamber 54, valve 57, which is open, and by-passes valve 58, which is closed; and into exit conduit 59. If the screened surface 51 is applied directly against the finest filter media 36, the size of the screen openings may be smaller or somewhat larger than the media particles of the top layer 36. Openings of four to five times the diameter of the finest particles have been found acceptable.

FIG. 8 shows the embodiment of FIG. 7 during the upwash stage. The screened surface 51 is withdrawn by the mechanical means 52 and the upwash gas enters at 29, passes through the turbulent layers 34–37, bypasses valve 57, which is closed, and passes out through valve 58, which is open, and into exit 60. Screen 53 protects against loss of the coarser particles in layer 37 during wash stage. All of the features of reverse graded media with down flow collection, combination coarse to fine to coarse grading with dual flow collection, final coarse media immediately below the hold down screen, oscillation-assisted suspension during upwash, finer denser media above coarser lighter media, and removal of filtrate through a side exit, which may be either an annular collection chamber or a perforated tube, can be employed in this embodiment as they were used in other embodiments.

To improve the fluidization of the sand bed during the upwash stage, and to prevent channeling of the upwash gas and localized spouting of the upwash gas stream, the filter media can be vibrated or oscillated during the upwash stage. FIG. 1 shows an oscillator 61 below the dust collector which actuates a metal rod 62 which attaches to vessel 23 through a spring system 63. The preferred arrangement is that the spring system and the oscillated mass form a resonant system at the frequency of the oscillator. A suggested stroke-frequency combination is $\frac{1}{8}$" stroke at 15 cycles per second.

An alternative to diaphragm 28 is flat leaflet 64 of FIG. 9. The leaflets 64 simply rely on the current of wash gas to lift them above the filter media and foraminous media during wash stage. Similarly, the downward current of pressure gas through conduit 42 urges the leaflets against the top of the filter media, where the leaflets overlap to form a diaphragm layer. A variety of plastic and glass fiber and ceramic materials are especially suited for use as leaflets 64. The leaflets may assume a variety of shapes, including round, square, rectangular, oval, or elliptical.

While portions of the disclosure are directed to a filter housing with a uniform upward flare, it should be understood that intermediate non uniform flaring and belling of the housing is also within the scope of the invention. For example, the invention contemplates the use of less dense coarse materials in the lower layers of the media, with the housing locally flared or belled in the appropriate manner to retain these layers at their proper position through self grading during the wash stage. With such appropriate variation in the diameter of selected portions of the filter housing 22, the size range of media particles can be greatly increased and the accuracy of gradation improved.

Experience with sand filters and gravel-bed filters on dirty gases has shown that the concentration of dust in the exit gases in the wash stage is much higher than in the incoming dirty gas during filtration stage, and at these higher concentrations of dust the total volume of dirty wash gas is but a fraction of the total volume of entering dirty gas to be filtered. At the higher concentrations of solids, the solids in the dirty washgas usually are removed by a mechanical separator, such as a settling chamber or a cyclone, and the wash gas with its unremoved dust is returned to the sand or gravel-bed filter along with the incoming dirty gas to be filtered. Where the dust in the dirty wash gas stream is not agglomerated sufficiently to permit it to be removed by simple mechanical methods, the dirty wash gas stream can be passed through a bag collector. Where the gas stream to be filtered is hot, the stream is cooled in a heat exchanger before it is passed through the bag collector.

Although the disclosure has been directed primarily to a filter using sand and gravel as the primary filtering media, the terms "sand filter" and "gravel bed filter" are intended to generically denote filters using all varieties of granular filter media, including coal, garnet, and similar natural materials, as well as glass or plastic beads and similar synthetic materials.

I claim:

1. A compressed media dust collector comprising:
   (a) a generally vertical filter housing having upper and lower housing portions, the lower housing portion containing a vertical column of at least two contiguous layers of granular filter media, a relatively lower layer having defined coarseness and specific gravity, and a top layer relatively above said lower layer having greater coarseness and lower specific gravity such that the top layer is naturally graded to the top of the column following upwash of the media;
(b) diaphragm means contained in said upper housing portion and moveable between an applied position against said top layer during filter stage to compress the filter media into stationary position and a withdrawn position during wash stage to permit the media to be lifted by wash fluid into the upper housing portion;
(c) a top closing the upper portion of the housing above the diaphragm means;
(d) first fluid passageway means near the bottom of the lower housing portion communicating with said lower layer of the filter media;
(e) second fluid passageway means in said filter housing communicating with said top layer of said media; and
(f) means for supplying pressure to the upper side of the diaphragm means for holding the diaphragm in applied position during filter stage.

2. The dust collector of claim 1, wherein said upper housing portion flares upwardly from the top of the lower housing portion without substantial intermediate construction between the two housing portions; and wherein said diaphragm means comprises a flexible sheet of material connected to said upper housing portion and having a central portion of suitable size to directly contact the top of said column of filter media during filter stage and a diaphragm side portion of suitable size to contact the flared sides of the upper housing portion between the top of the lower housing portion and the connection between the diaphragm means and the upper housing portion during filter stage, and further comprising an outlet opening in the side of the upper housing portion below the connection of the diaphragm means.

3. The dust collector of claim 2, wherein said means for supplying pressure comprises gas pressurizing means in the upper housing portion above the diaphragm means.

4. The dust collector of claim 1, wherein said diaphragm means comprises a perforated member for permitting the passage of fluid therethrough, said perforations being smaller than the coarseness of said top layer of filter media for permitting the diaphragm means to be held against said top media layer by pressure within said upper portion of the housing.

5. The dust collector of claim 4, wherein said diaphragm comprises a ceramic cloth material.

6. The dust collector of claim 1, wherein said diaphragm means comprises a screened plate having perforations smaller than the coarseness of said top layer of media, and said means for supplying pressure comprises a mechanical actuator.

7. The dust collector of claim 1, wherein said column of granular filter media further comprises at least a third layer contiguous with said two layers, wherein said third layer is below said lower layer, is of relatively coarser material than the lower layer, and is of specific gravity such that it is self-grading after upwash of the media to a position below the lower layer.

8. The dust collector of claim 7, wherein said dust collector further comprises third fluid passageway means in said lower housing portion in communication with said lower layer of filter media.

9. The dust collector of claim 8, wherein said third fluid passageway means comprises a perforated tube extending into said lower layer of media and connected to the filter housing.

10. The dust collector of claim 7, wherein the specific gravity of said lower media layer is relatively greater than the specific gravity of said third layer.

11. The dust collector of claim 1, wherein said granular filter media further comprises at least a third layer of filter media contiguous with said first two layers, wherein said at least a third layer is below said lower layer and of relatively less coarseness and greater specific gravity, such that the layers are self-grading upwardly from fine to coarse during upwash of the media for downflow filtration.

12. A compressed media dust collector comprising:
(a) a filter housing having a lower portion with a generally vertical column of granular filter media contained therein in a stationary position during filter stage, and an upper housing portion having an upward flare for reducing the velocity of upwash gas during wash stage;
(b) gas inlet means near the bottom of said housing for admitting gas for upflow through the filter media;
(c) dirty gas outlet means near the top of said housing for removing wash gas during wash stage;
(d) clean gas outlet means near the top of said housing for removing filtered gas during filter stage; and
(e) reuseable diaphragm means contained in said housing above said stationary position of the filter media and moveable between an applied position pressing against the top of the media column and holding the media in stationary position during the filter stage and a retracted position during wash stage raised above said applied position, wherein said upper housing portion contains said diaphragm means and wherein said dirty gas outlet opening is located in the upward flare and below the position of the diaphragm means during wash stage.

13. A method of filtering a dirty gas, comprising:
(a) passing a dirty gas from a supply of such gas into the lower end of a layered column of graded granular filter media contained in a filter housing;
(b) passing the dirty gas first through a lower layer of filter media that is relatively coarse and of defined specific gravity, and then passing the gas through a contiguous upper layer that is relatively finer and of defined specific gravity, the coarseness and specific gravity of the contiguous layers being such that the settling velocity of the media in the lower layer is greater than the settling velocity of the media in the upper layer;
(c) simultaneously with passing the gas through the media compressing the media vertically by means of a diaphragm applied from the top of the column to maintain all media layers in stationary position;
(d) passing gas filtered through the upper layer out of the housing through a first exit;
(e) cleaning captured dirt from the media column by withdrawing the diaphragm from the top thereof and passing wash gas into the lower end of the media column and upwardly therethrough, suspending media grains in the upward flow;
(f) passing the wash gas out of the housing through a second exit; and
(g) terminating the flow of wash gas to permit the media grains to settle in the housing in accordance with the settling velocities of the grains.

14. The method of claim 13, further comprising passing dirty gas through a top layer of filter media contiguous with and above said upper layer and of greater coarseness and lower density than the upper layer such that the settling velocity of the media in the top layer is less than the settling velocity of the media in the upper layer.

15. The method of claim 13, further comprising: passing the wash gas through upwardly flared housing sides of said filter housing in the area of the housing where media grains are suspended in the gas to reduce the upward velocity of the wash gas through the flared area, said second exit being below the withdrawn diaphragm and in communication with the flared housing sides.

16. The method of claim 13, further comprising oscillating the column of media while passing the wash gas therethrough.

17. A method of filtering a dirty gas, comprising:
(a) passing a dirty gas from a supply of such gas into the upper end of a layered column of a graded granular filter media contained in a filter housing;
(b) passing the dirty gas first through an upper layer of filter media that is relatively coarse and of defined specific gravity, and then passing the gas through a contiguous lower layer of media that is relatively finer and of defined specific gravity, the coarseness and specific gravity of the contiguous layers being such that the settling velocity of the media in the lower layer is greater than the settling velocity of the media in the upper layer;
(c) simultaneously with passing the gas through the media, compressing the media vertically by means of a diaphragm applied from the top of the column to maintain all media layers in stationary position;
(d) passing the gas filtered through the lower layer out of the housing through a first exit;
(e) cleaning captured dirt from the media column by withdrawing the diaphragm from the top thereof and passing wash gas into the lower end of the media column and upwardly therethrough, suspending media grains in the upward flow;
(f) passing the wash gas out of the housing through a second exit; and
(g) terminating the flow of wash gas to permit the media grains to settle in the housing in accordance with the settling velocities of the grains.

18. The method of claim 17, further comprising passing dirty gas through a bottom layer of filter media contiguous with and below said lower layer and of greater coarseness and defined specific gravity than the lower layer such that the settling velocity of the media of the bottom layer is greater than the settling velocity of the media in the lower layer.

19. A method of cleaning a dirty gas of entrained particulate matter, comprising:
(a) passing said dirty gas through a substantially vertical column of graded filter media in the direction from coarse to fine media while simultaneously compressing the column vertically into stationary position by means of a diaphragm applied against the top of the column to permit high gas filter rates;
(b) washing the captured particulate matter from the media by releasing the diaphragm hold-down and pumping gas into the column from the lower end thereof at a sufficient rate to fluidize the column while oscillating the media with a spring system an oscillated media forming a resonant system at the frequency of the oscillator; and
(c) grading the column by reducing upflow of gas and allowing the filter media to settle in accordance with the settling velocities of the particles.

* * * * *